(12) United States Patent
Carlson et al.

(10) Patent No.: US 8,005,820 B2
(45) Date of Patent: *Aug. 23, 2011

(54) OPTIMIZING THE PROCESSING OF IN-LIST ROWS

(75) Inventors: James Carlson, Rancho Palos Verdes, CA (US); Grace Au, Rancho Palos Verdes, CA (US); Bhashyam Ramesh, Secunderabad (IN); Haiyan Chen, Yorktown Heights, NY (US)

(73) Assignee: Teradata US, Inc., Dayton, OH (US)

( * ) Notice: Subject to any disclaimer, the term of this patent is extended or adjusted under 35 U.S.C. 154(b) by 221 days.

This patent is subject to a terminal disclaimer.

(21) Appl. No.: 11/535,670

(22) Filed: Sep. 27, 2006

(65) Prior Publication Data

US 2007/0073676 A1 Mar. 29, 2007

(51) Int. Cl.
*G06F 17/30* (2006.01)
*G06F 7/00* (2006.01)

(52) U.S. Cl. .................................................. 707/714
(58) Field of Classification Search .................. 707/1–4, 707/100

See application file for complete search history.

(56) References Cited

U.S. PATENT DOCUMENTS

| 5,848,408 | A | 12/1998 | Jakobsson et al. |
| 5,963,932 | A | 10/1999 | Jakobsson et al. |
| 6,397,204 | B1 * | 5/2002 | Liu et al. ........................ 707/2 |
| 6,629,102 | B1 * | 9/2003 | Malloy et al. ................ 707/102 |
| 6,990,484 | B1 * | 1/2006 | Ghazal et al. ................ 707/770 |
| 2004/0249845 | A1 * | 12/2004 | Das ............................. 707/101 |

* cited by examiner

*Primary Examiner* — Uyen T. Le
(74) *Attorney, Agent, or Firm* — John D. Cowart

(57) ABSTRACT

A SQL query that includes an IN-List is optimized by utilizing an array insert to insert the IN-List into a spool and piggybacking IN-List rows into a join step.

16 Claims, 5 Drawing Sheets

OPTIMIZING THE PROCESSING OF IN-LIST ROWS

BACKGROUND

Relational database systems store data in tables organized by columns and rows. The tables typically are linked together by "relationships" that simplify the storage of data and make complex queries against the database more efficient. Structured Query Language (or SQL) is a standardized language for creating and operating on relational databases.

Relational database systems, such as Teradata, a database by NCR Corporation, may also be operated on a MPP (massively parallel processing system) to allow a large amount of data and a large amount of transactions to be efficiently processed. A MPP is normally divided up into separate AMPs (access module processors). Each AMP has some independence in the tasks it performs, but also works cooperatively with other units. The rows of a table locate on some or all AMPs. To join two tables, the rows of each of the tables that are to be joined have to be located on the same AMP. This is achieved by redistributing one or both tables or by duplicating one table onto another AMP.

A relational database system typically includes an "optimizer" that plans the execution of SQL queries. For example, the optimizer will select a method of performing the SQL query which produces the requested result in the shortest period of time or to satisfy some other criteria.

In a MPP, it is very resource intensive to insert a large number of rows one at one time. Row insertions are computationally intensive, but they are performed individually because each row may have to be placed in a different AMP. Moreover, if a copy of each inserted row is required in each of the AMPs, then once the row is inserted into one AMP, the insert instruction must be followed by a retrieve instruction to allow the row to be duplicated across all AMPs.

SUMMARY

An optimization technique is provided that allows for the spooling of a number of IN-List rows. This is accomplished, for example, by using an array insert technique or by piggybacking IN-List rows into a join step.

In general, in one aspect, the invention features a method for optimizing a SQL query, in which the SQL query includes an IN-List and the optimizer utilizes the IN-List as a relation, where the method includes materializing the IN-List into a form that can be utilized by a join operation.

The method may include utilizing array insert steps to insert the IN-List into a spool. The method may piggyback IN-List rows into a join step. The method may determine whether a plurality of IN-Lists are specified by a query, and if so, expand the IN-List on each of a plurality of processing modules. The method may include evaluating whether the IN-List is to be duplicated across a plurality of processing modules, and if so, sending the array insert step containing IN-List rows to each of the plurality of processing modules. The method may include evaluating whether the IN-List is to be redistributed to a plurality of processing modules, and if so, querying the IN-List rows on the basis of a hashing function, packing the IN-List rows belonging to the same processing module into one array inlet step, and sending the array insert step to the processing modules specified by the function. The method may include inserting the largest IN-List into a spool, and packaging the next largest IN-List with the spooled IN-List. This method step may be repeated until all IN-Lists are packaged.

In general, in another aspect, the invention features a database system for accessing a database. The database system includes a massively parallel processing system, which includes one or more nodes, a plurality of CPUs, each of the one or more nodes providing access to one or more CPUs, a plurality of virtual processes each of the one or more CPUs providing access to one or more processes, each process configured to manage data stored in one of a plurality of data-storage facilities, and an optimizer for optimizing a plan for executing a query. Where the SQL query includes an IN-List selected by optimizer to be converted into a relation, the optimizer includes a process of materializing the IN-List into a form that can be utilized by a join operation.

In general, in another aspect, the invention features a computer program, stored on a tangible storage medium, for use in optimizing a query. The program including executable instructions that materializes the IN-List into a form that can be utilised by a join operation.

Other features and advantages will become apparent from the description and claims that follow.

DETAILED DESCRIPTION

Figure 1:
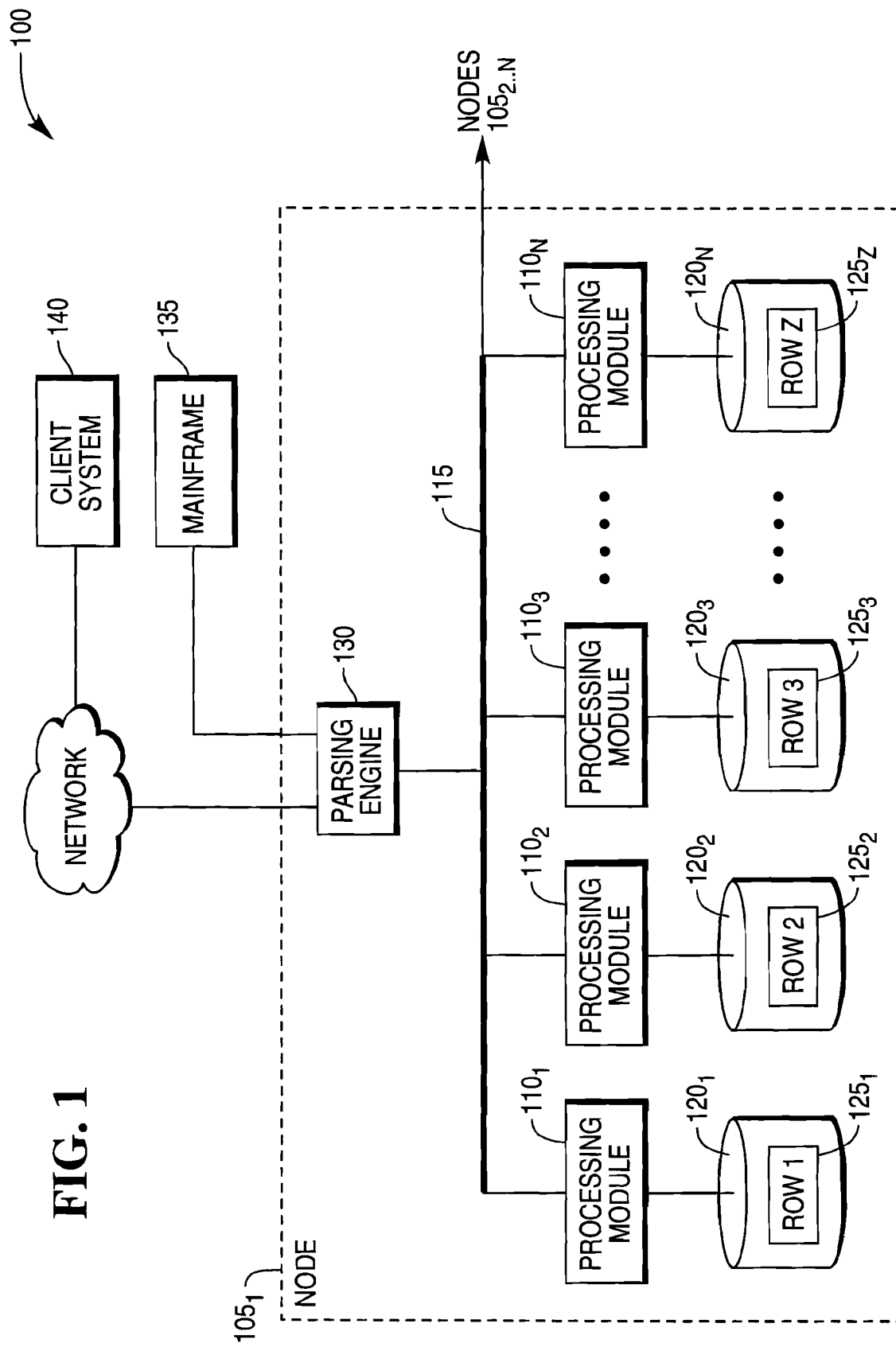
FIG. 1 is a block diagram of a node of a database system.

The query optimization technique disclosed herein has particular application to large databases that might contain many millions or billions of records managed by a database system ("DBS") 100, such as a Teradata Active Data Warehousing System available from NCR Corporation. FIG. 1 shows a sample architecture for one node $105_1$ of the DBS 100. The DBS node $105_1$ includes one or more processing modules $110_{1 \ldots N}$, connected by a network 115 that manage the storage and retrieval of data in data-storage facilities $120_{1 \ldots N}$. Each of the processing modules $110_{1 \ldots N}$ may be one or more physical processors or each may be a virtual processor, with one or more virtual processors running on one or more physical processors.

For the case in which one or more virtual processors are running on a single physical processor, the single physical processor swaps between the set of N virtual processors.

For the case in which N virtual processors are running on an M-processor node, the node's operating system schedules the N virtual processors to run on its set of M physical processors. If there are 4 virtual processors and 4 physical processors, then typically each virtual processor would run on its own physical processor. If there are 8 virtual processors and 4 physical processors, the operating system would distribute the 8 virtual processors across the 4 physical processors, in which case swapping of the virtual processors would occur.

Each of the processing modules $110_{1 \ldots N}$ manages a portion of a database that is stored in a corresponding one of the data-storage facilities $120_{1 \ldots N}$. Each of the data-storage facilities $120_{1 \ldots N}$ includes one or more disk drives. The DBS may include multiple nodes $105_{2...N}$ in addition to the illustrated node $105_1$, connected by extending the network 115.

The system stores data in one or more tables in the data-storage facilities $120_{1...N}$. The rows $125_{1...Z}$ of the tables are stored across multiple data-storage facilities $120_{1...N}$ to ensure that the system workload is distributed evenly across the processing modules $110_{1...N}$. A parsing engine 130 organizes the storage of data and the distribution of table rows $125_{1...Z}$ among the processing modules $110_{1...N}$. The parsing engine 130 also coordinates the retrieval of data from the data-storage facilities $120_{1...N}$ in response to queries received from a user at a mainframe 135 or a client computer 140. The DBS 100 usually receives queries in a standard format, such as SQL.

Figure 2:
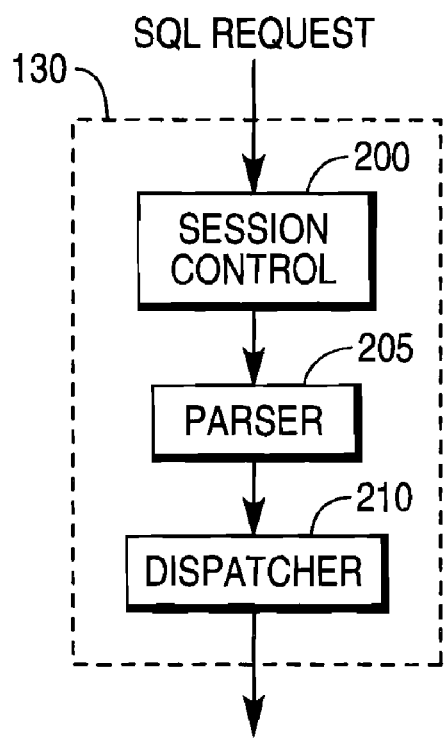
FIG. 2 is a block diagram of a parsing engine.

In one example system, the parsing engine 130 is made up of three components: a session control 200, a parser 205, and a dispatcher 210, as shown in FIG. 2. The session control 200 provides the logon and logoff function. It accepts a request for authorization to access the database, verifies it, and then either allows or disallows the access.

Figure 3:
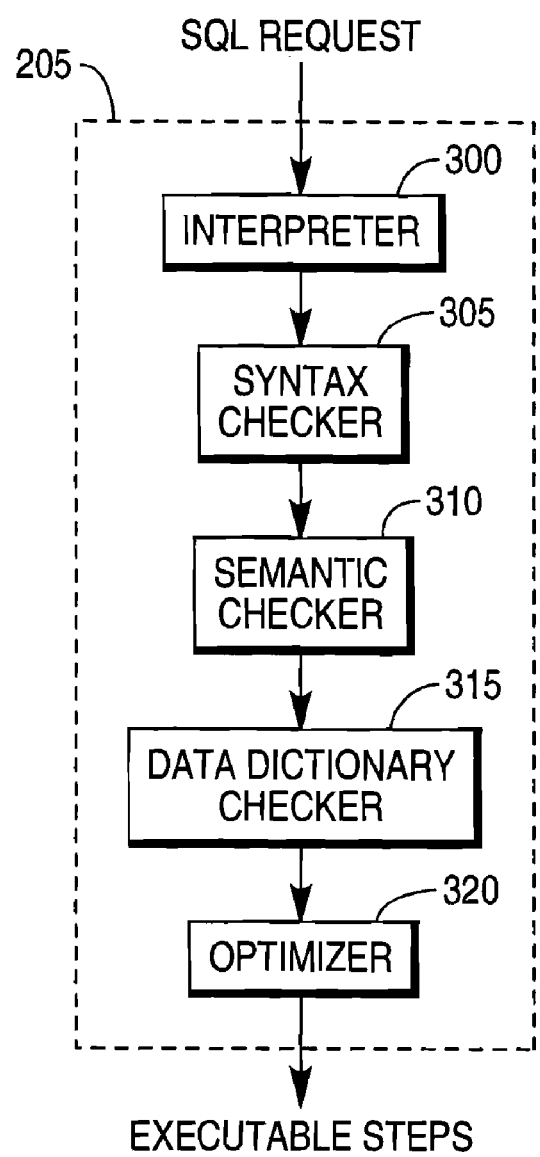
FIG. 3 is a flow chart of a parser.

Once the session control 200 allows a session to begin, a user may submit a SQL request that is routed to the parser 205. As illustrated in FIG. 3, the parser 205 interprets the SQL request (block 300), checks the request for proper SQL syntax (block 305), evaluates the request semantically (block 310), and consults a data dictionary to ensure that all of the objects specified in the SQL request exist and that the user has the authority to perform the request (block 315). Finally, the parser 205 runs an optimizer (block 320) that selects the least computationally expensive plan available to execute the request.

An important element of the Teradata Active Data Warehousing System available from NCR Corporation is the ability to access data in a table by utilising an IN-List request. As an IN-List is a list of values specified on the same columns, an IN-List is analogous to an array of rows. The Teradata optimizer has been enhanced to treat an IN-List as a relation, to improve the performance of the executing query. To support using an IN-List as a relation, the IN-List is materialized into a form, such as a spool, from which a join operation can retrieve rows.

The ANSI insert step can be used to insert IN-List rows into a spool, which equates to one row per step. This may affect system performance in a Teradata MPP system. To ameliorate the system performance issues, the optimizer enhances the insert step to accept multiple rows in one insert step.

Figure 4:
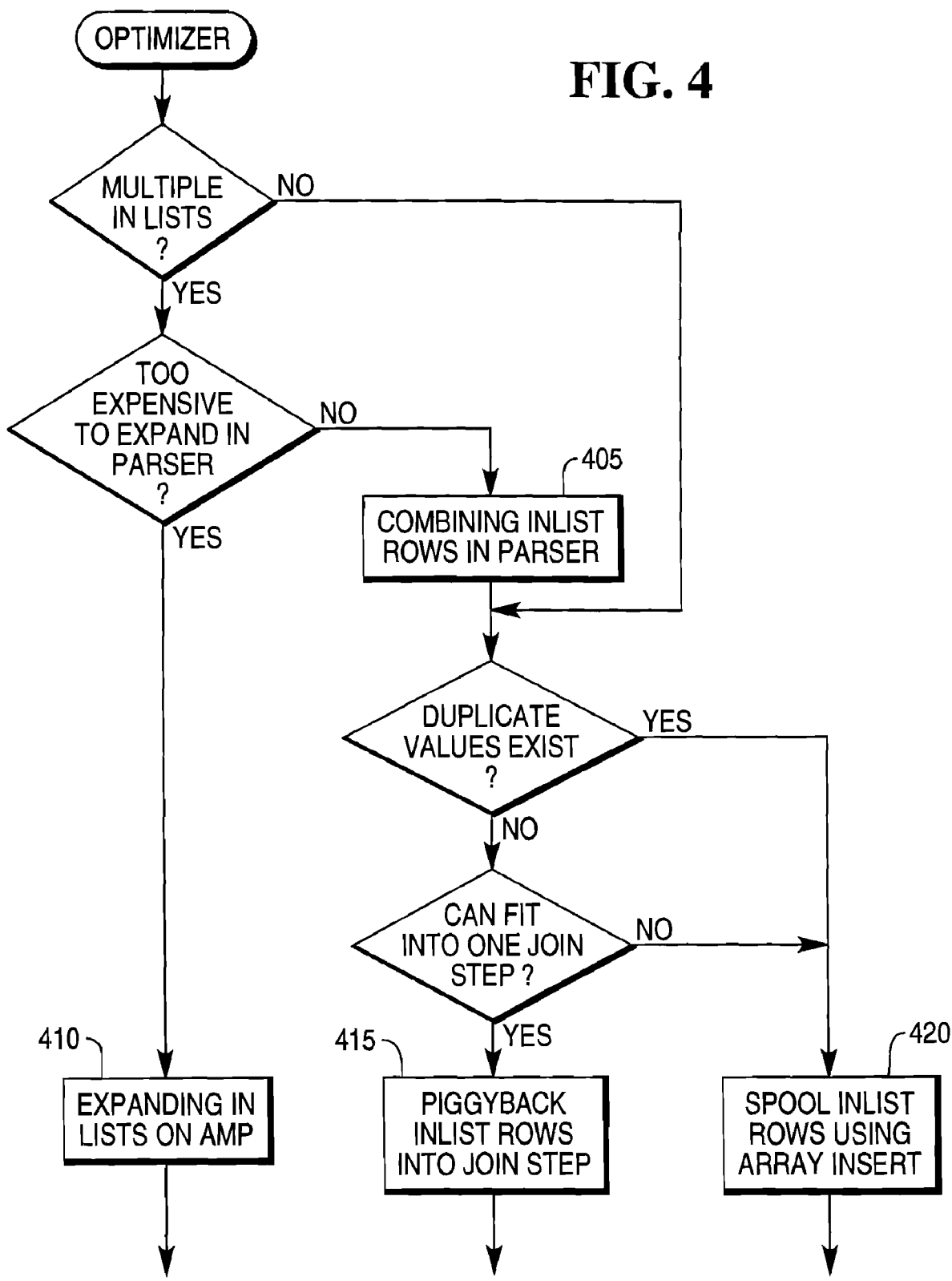
FIG. 4 is a flow chart of the methodology followed by the optimizer to choose different methods to materialize In-List rows.

As illustrated in FIG. 4, the optimizer (block 400) determines when to use the three different methods for materializing IN-List into a form which can then be utilized by a join. The most general method is to create a spool to hold IN-List rows by using an array insert (block 420). In the case where multiple IN-Lists exist, the IN-Lists are combined in the parser (block 405) to form an array of IN-List rows that can then be spooled by the array insert technique.

In addition to the general method, two other optimized methods can also be used for special cases. One optimal method is piggybacking IN-List rows into a join step (block 415) when there is no duplicate IN-List rows and hence the IN-List rows can fit into one join step. The other optimal method is expanding IN-Lists on processing modules (Access Module Processors or AMPs) (block 410). This method can be used when combining IN-Lists in the parser is too computationally expensive.

Figure 5:
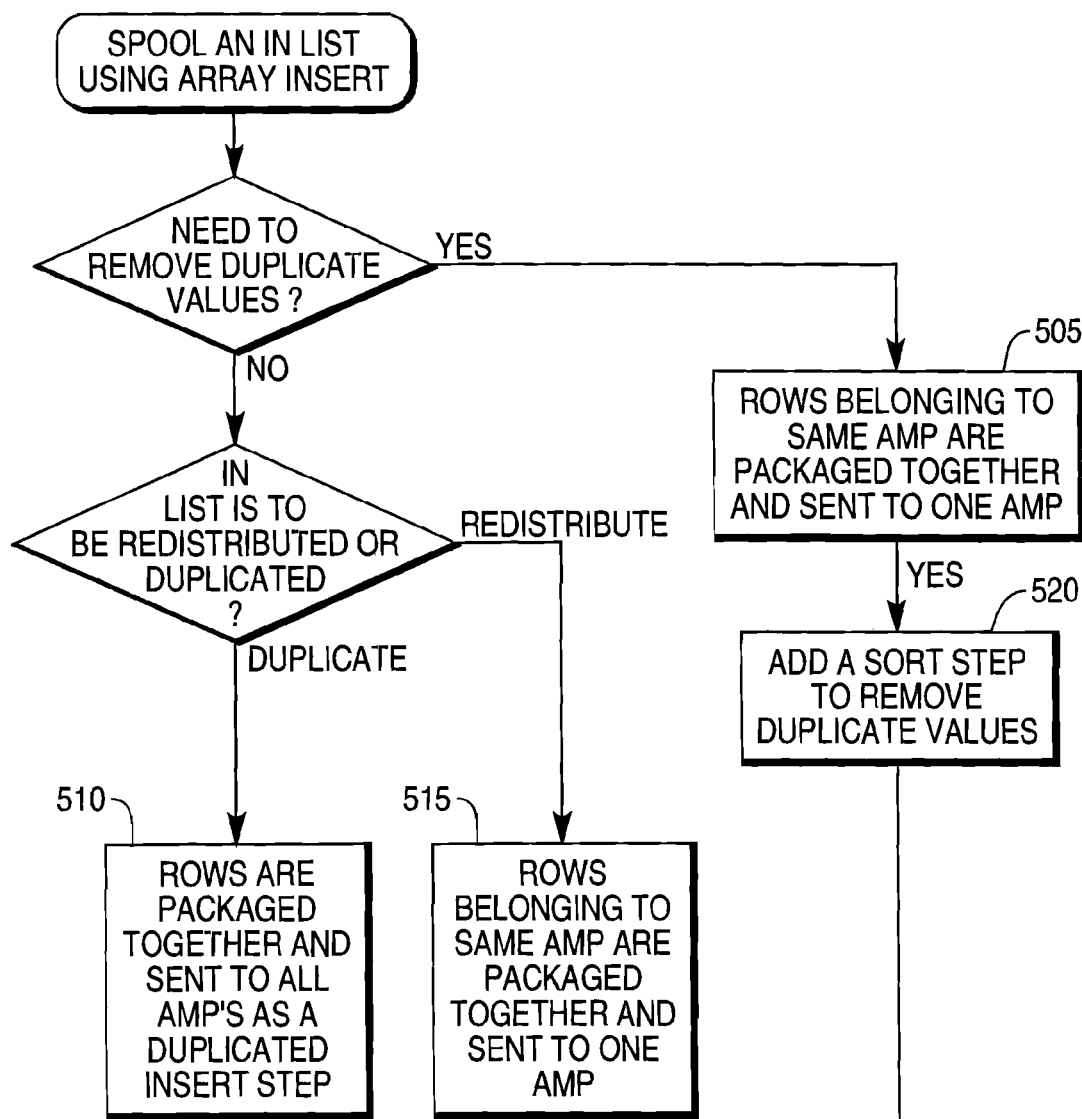
FIG. 5 is a flow chart of techniques for spooling of IN-List rows using array insert.

FIG. 5 illustrates the manner in which an IN-List is spooled by using the Array Insert technique. When a parser doesn't perform a duplicate elimination on IN-List rows, thereby requiring duplicate elimination to be performed on each AMP, the IN-List rows are first redistributed to each of the AMPs based on all fields of the IN-List rows. This is achieved by grouping IN-Lists according to their row hash and only packing rows belonging to same AMP into the same INSERT step (block 505). A sort step follows to remove duplicate values in the IN-List spool. The IN-List spool once duplicates are removed, can be redistributed (block 525) or duplicated (block 530) as needed. When duplicate elimination is performed in the parser, redistributing and duplicating IN-List rows into a spool can be performed within the array insert step as shown in block 510 and block 515.

One example where IN-List rows are to be redistributed based on a hashing function is an IN-List relation which is merge joined with the primary index of a fact table, as supported by IN-List access path. The rows belonging to the same AMP will be packaged together and inserted into the AMP. Where the rows in the array are to be duplicated on all AMPs, such as following a nested join with a secondary index of a fact table, the rows are packaged together and sent to all AMPs as a duplicated insert step.

When the number of IN-List rows is small and duplicate elimination has been performed in the parser, piggybacking IN-List rows into join steps is the most efficient method available, as no spooling is required. However, this is only possible if the join steps are enhanced to read from an IN-List row format. With the piggybacking method, IN-List rows are sent to an AMP along the join step, which saves the computational overhead associated with sending separate messages for spooling. The piggybacked IN-List rows reside in volatile memory, which saves the computational overhead of writing and reading from the spool.

The piggybacking method is also used in an IN-List star join. An IN-List is combined with another dimension table before the resultant table is combined with a fact table. A piggybacked product join step is used so that the array of IN-List rows is sent directly with a product join step to all AMPs. The same mechanism that is used to package an array of rows into an insert step is used to package rows into the piggybacked product join step.

A normal product join step takes two tables as inputs (LeftTable and RightTable). Rows are read from the input tables using file system services. For the piggybacked product join, the RightTable is an array of InListRows that are accessed directly in memory. That is, the Cartesian join is between a LeftTable and a virtual table. Utilizing a virtual table prevents the computational overhead associated with writing the IN-List rows to a spool and reading them from a spool for the product join.

Figure 6:
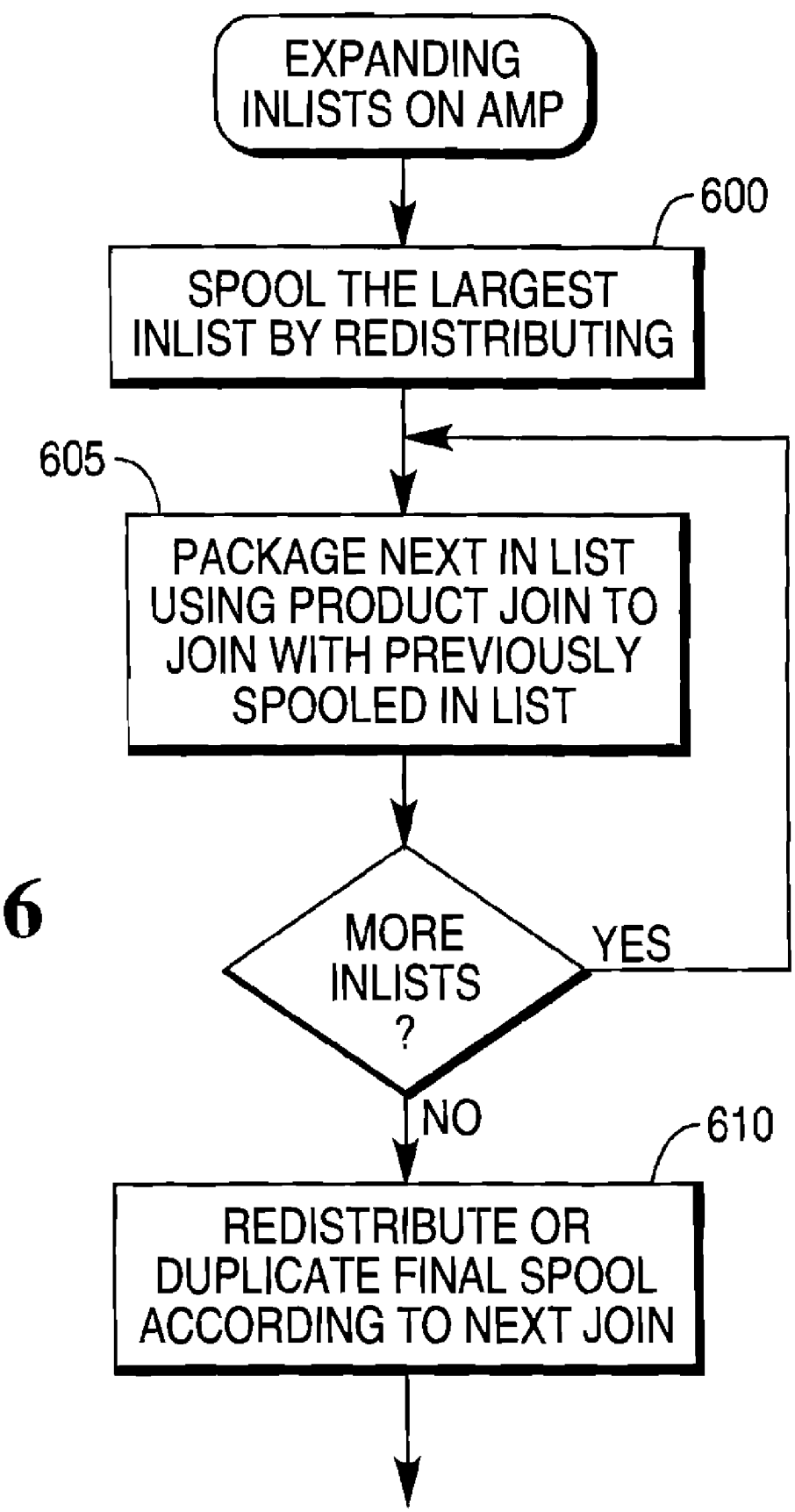
FIG. 6 is a flow chart of a technique for expanding IN-Lists on an AMP.

When two or more IN-List predicates are specified by a query, combining the predicates into one IN-List on the AMPs, by utilizing the parallelism of the AMPs, may be more efficient. Array Insert is used in conjunction with Piggybacked Product Join to accomplish spooling of the IN-List rows. As illustrated in FIG. 6, the spooling is accomplished as follows:

1. Use Array Insert to redistribute the largest IN-List into a spool (block 600);
2. Package the next IN-Lists in a Piggybacked Product Join step to join with the previously spooled IN-List or the result spool of the previous piggybacked product join (block 605); and
3. Repeat Step 2 until all the IN-Lists have been combined.

The final IN-List spool may then be redistributed or duplicated as required (block 610).

The methods described can result in significant computing resource efficiencies. This may include a reduction in the number of messages generated, a reduction in the number of AMP worker task instances initiated, and a reduction in the total amount of IO (Input/Output Operators).

For example, if there are 100 AMPs in a MPP and 1000 rows are inserted, using a prior art methodology results in the generation and termination of 1000 messages, 1000 AMP tasks and 1000 TO. Using the method described herein, at worst, the number of messages and AMP worker tasks generated and terminated is a tenth of this figure. The IO will also reduce depending on the number of rows per block.

The text above described one or more specific embodiments of a broader invention. The invention also is carried out in a variety of alternative embodiments and thus is not limited to those described here. For example, while the invention has been described here in terms of a DBMS that uses a massively parallel processing (MPP) architecture, other types of database systems, including those that use a symmetric multiprocessing (SMP) architecture, are also useful in carrying out the invention. Many other embodiments are also within the scope of the following claims.

We claim:

1. A computer-implemented method for optimizing a database query, in which the database query includes an IN-List, and in which a query optimizer component in a computing system utilizes the IN-List as a relation, where the method includes:
    materializing, by the computing system, the IN-List into one or more values for use by a join operation.
2. The method of claim 1 further including performing, by the computing system, one or more array insert operations to insert the one or more values into a spool.
3. The method of claim 2 further including
    evaluating, by the computing system, whether the IN-List is to be duplicated across a plurality of processing modules, and if so
    performing one or more of the array INSERT operations on each of the plurality of processing modules.
4. The method of claim 2 further including evaluating, by the computing system, whether the IN-List is to be redistributed to a plurality of processing modules, and if so
    grouping, by the computing system, rows of a database table that satisfy the IN-List on the basis of a hashing function,
    packing, by the computing system, a portion of the rows that belong to same processing module into one array insert operation, and
    performing one or more of the array INSERT operations on the processing module specified by the hash function.
5. The method of claim 1 further including performing, by the computing system, a join operation and including the one or more values.
6. The method of claim 1 further including
    determining, by the computing system, whether a plurality of IN-Lists are specified by the database query, and if so
    using a plurality of processing modules to process the IN-Lists.
7. The method of claim 6 further including
    assessing, by the computing system, which of the plurality of IN-Lists is largest,
    inserting, by the computing system, one or more values that satisfy the largest IN-List into a spool, and
    packaging, by the computing system, in the spool one or more values satisfying an IN-List that follows the largest IN-List.
8. The method of claim 7 further including repeating, in the computing system, the method step of packaging in the spool a following IN-List until one or more values for all IN-Lists are packaged into the spool.
9. A database system for accessing a database, the database system including
    a parallel processing system including one or more processing modules;
    a plurality of CPUs, each of the one or more processing modules providing access to one or more CPUs,
    a plurality of virtual processes, each of the one or more CPUs providing access to one or more of the virtual processes, each process configured to manage data stored in one of a plurality of data-storage facilities,
    a query optimizer configured to optimize a plan for executing a database query to access data in a table, the optimizer including a routine configured to utilize an IN-List as a relation, wherein the IN-List is materialized into one or more values for use by a join operation.
10. The database system of claim 9 where the query optimizer is configured to perform one or more array insert operations to insert the one or more values into a spool.
11. The database system of claim 10 where the query optimizer is also configured to:
    evaluate whether the IN-List is to be duplicated across a series of processing modules, and if so
    perform one or more of the array INSERT operations on each of the plurality of processing modules.
12. The database system of claim 10 where the query optimizer is also configured to:
    evaluate whether the IN-List is to be distributed to different processing modules, and if so,
        group rows of the table that satisfy the IN-List on the basis of a hashing function;
        pack a portion of the rows that belong to the same processing module into one array insert operation; and
        perform one or more of the array INSERT operations on the processing module specified by the hashing function.
13. The database system of claim 12 where the query optimizer is also configured to:
    assess which of the plurality of IN-Lists is largest,
    insert one or more values that satisfy the largest IN-List into a spool, and
    package in the spool one or more values satisfying an IN-List that follows the largest IN-List.
14. The database system of claim 9 where the optimizer is configured to perform a join operation and include the one or more values.
15. The database system of claim 9 where the query optimizer is also configured to:
    determine whether a plurality of IN-Lists are specified by the database query, and if so
    instruct a plurality of processing modules to process the IN-Lists.
16. The database system of claim 9 where the query optimizer is configured to continue assessing, inserting and packaging until one or more values satisfying all IN-Lists are packaged into the spool.

* * * * *